(12) United States Patent
Dore et al.

(10) Patent No.: US 8,130,876 B2
(45) Date of Patent: Mar. 6, 2012

(54) METHOD FOR RECEIVING A MULTI-CARRIER SIGNAL, TRANSMISSION METHOD, CORRESPONDING RECEIVER AND TRANSMITTER

(75) Inventors: Renaud Dore, Rennes (FR); Vincent Demoulin, Montfort sur Meu (FR); Olivier Mocquard, Rennes (FR); Samuel Guillouard, Chantepie (FR)

(73) Assignee: Thomson Licensing, Boulogne-Billancourt (FR)

( * ) Notice: Subject to any disclaimer, the term of this patent is extended or adjusted under 35 U.S.C. 154(b) by 238 days.

(21) Appl. No.: 12/086,944

(22) PCT Filed: Dec. 20, 2006

(86) PCT No.: PCT/EP2006/069970
§ 371 (c)(1),
(2), (4) Date: Apr. 19, 2010

(87) PCT Pub. No.: WO2007/071705
PCT Pub. Date: Jun. 28, 2007

(65) Prior Publication Data
US 2010/0208840 A1    Aug. 19, 2010

(30) Foreign Application Priority Data
Dec. 22, 2005    (FR) ..................................... 05 54051

(51) Int. Cl.
*H04L 27/06* (2006.01)
(52) U.S. Cl. ........ 375/340; 375/260; 375/316; 375/354; 370/203; 370/204; 370/206; 370/208; 370/210; 370/480; 370/503; 370/508; 370/509; 370/510; 370/511; 370/512; 370/513; 370/514; 455/502; 327/141; 714/707; 708/300; 708/319; 708/491

(58) Field of Classification Search ............... 375/316, 375/340, 260, 354; 708/300, 319, 491; 370/203, 370/204, 206, 208, 210, 480, 503, 508–514; 455/502; 327/141; 714/707
See application file for complete search history.

(56) References Cited

U.S. PATENT DOCUMENTS
6,317,409 B1 * 11/2001 Murakami .................... 370/203

OTHER PUBLICATIONS

M.R. Kosek et al: "RNS-based GaAs signal processing system", IEEE, Oct. 15, 1989, pp. 615-619.
M.A. Payoumi et al: "A Quadratic Residue Processor for Complex DSP Applications", Int'l Conference on Acoustics, Speech & Signal Processing, Apr. 6-9, 1987, IEEE, vol. 1 Conf. 12, pp. 475-478.
A.S. Madhukumar et al: "Design and performance of residue number system based multicarier CDMA in frequency-selective rayleigh fading channels", Signals, Systems and Computers, 2000 Conference record of the thirty-fourth Asilomar Conf. on Oct. 29-Nov. 1, 2000, vol. 2, pp. 884-888.
F.J.Taylor: Hwang Kai Institute of Electrical and Electronics Engineers: "A More Efficient Residue Arithmetic Implementation of the FFT" Proceedings of the Symposium on Computer Arithmetic, Jun. 4-6, 1985, vol. Symp. 7, Jun. 4, 1985, pp. 243-250.
Search Report Dated Apr. 3, 2007.

* cited by examiner

*Primary Examiner* — Leon Flores
(74) *Attorney, Agent, or Firm* — Tutunjian & Bitetto, P.C.

(57) ABSTRACT

The invention concerns a method for receiving a multi-carrier signal of reduced complexity when the number of carriers is not high. The method includes: demodulating the multi-carrier signal; converting a received signal received in binary representation into a modal representation in a base of at least two mutually prime numbers on a finite space of size equal to the product of the mutually prime numbers; demodulating including conversion.

12 Claims, 7 Drawing Sheets

METHOD FOR RECEIVING A MULTI-CARRIER SIGNAL, TRANSMISSION METHOD, CORRESPONDING RECEIVER AND TRANSMITTER

1. SCOPE OF THE INVENTION

The present invention relates to the radio communications domain and more particularly the transmission and reception of a multi-carrier signal.

2. TECHNOLOGICAL BACKGROUND

According to the prior art, there are several types of modulation for multi-carrier signals, such as DMT (Discrete MultiTone) modulation or OFDM (Orthogonal Frequency Division Multiplexing) modulation or COFDM (corresponding to a coded OFDM modulation). According to the prior art, the demodulation of a multi-carrier signal implements an FFT (Fast Fourier Transform) based on a binary representation of an OFDM symbol. Hence, the document entitled "Principles of modulation and channel coding for digital broadcasting for mobile receivers" (by Alard and Lassale and published in August 1987 in the EBU technical revue) describes a method for the demodulation of an ODFM signal implementing an FFT. COFDM modulation is also implemented in numerous radio telecommunications standards particularly for DAB (Digital Audio Broadcasting), DVB-T (Digital Video Broadcasting—Terrestrial), DVB-H (DVB-Handheld), IEEE 802.11 to 5 GHz, IEEE 802.16.

An FFT at N points (for example 256) involves taking N complex inputs (the $i^{th}$ input being noted input(i)) and supplying N outputs (the $k^{th}$ output being noted output(k)) as defined hereafter:

$$\text{Output}(k) = \sum_{i=-N/2+1}^{N/2} \text{input}(i) * \exp(-2ji\pi k/N) \quad (1)$$

The k integer being comprised in the interval $]-N/2;+N/2]$ and where j corresponds to a purely imaginary number.

According to the formula (1), the number of multiplications and additions is of the order of $N^2$. According to the prior art, in order to reduce the number of operations, an elementary operation is used called the butterfly. This operation is in multiple steps and of a complexity of the order of $N*\text{Log}(N)$ operations, where the operator Log is expressed in the "radix" base and is typically equal to 2 or 4. Hence, an FFT at 64 points is typically in three steps in a base of 4 or in six steps in a base of 2 ($64=4^2=2^6$). At each step, the input signal is multiplied on n bits by a "twiddle" factor on p bits. The result of a step is rounded off prior to being used as an input for the following step, the multiplier being particularly large (for example 12×10 bits). Typically, an FFT module waits for the last block sample to come and can deliver an FFT output a few clock cycles later.

Hence, the prior art presents the inconvenience of being relatively complex especially when the number of carriers is low.

3. SUMMARY OF THE INVENTION

The purpose of the invention is to overcome the disadvantages of the prior art.

More particularly, the object of the invention is to enable a demodulation while reducing its complexity, while being more efficient and/or consuming less energy.

For this purpose, the invention proposes a method for the reception of a multi-carrier signal (for example COFDM or DMT), characterized in that it comprises:
  a demodulation step of a multi-carrier signal,
  a conversion step of a signal received in binary representation into a modal representation (for example RNS or QRNS) in a base of at least two mutually prime numbers on a finite space of a size equal to the product of the relatively prime numbers,
  the demodulation step including the conversion step.

Advantageously, the demodulation step comprises a Fourier transform step of the multi-carrier signal, the Fourier transform step comprising:
  a conversion step of the multi-carrier signal in binary representation into a representation in a base of at least two relatively prime numbers on a finite space of size equal to the product of the relatively prime numbers, and
  a conversion step of a frequency type multi-carrier signal in a finite space into a temporal signal represented in a finite space,
  a conversion step of a temporal signal in a finite space into a binary signal.

Advantageously, for each relatively prime number, the method comprises a Fourier transform calculation step of the signal in modal representation projected onto the space generated by the number, known as the one-dimensional modal space calculation step.

Preferably, the step of one-dimensional modal space calculation comprises the steps of Fourier transform calculation for each of the carriers of the multi-carrier signal.

According to an advantageous characteristic, the step of one-dimensional modal space calculation comprises the Fourier transform calculation steps for a reduced number of carriers of the multi-carrier signal.

According to a particular characteristic, the step of onedimensional modal space calculation comprises a differentiated frequency correction according to the carrier considered.

According to an advantageous characteristic, the method comprises a sliding window Fourier transform step.

Preferentially, the method comprises a signal conversion step of a modal representation into an intermediary representation so as to enable a comparison of signal values.

Advantageously, the method comprises a synchronization step that comprises a conversion step of the multi-carrier signal in binary representation into a representation in a base of at least two relatively prime numbers on a finite space of size equal to the product of the relatively prime numbers.

In order to simplify the implementation, the conversion step used for the synchronization is partly or entirely common with a conversion step used in a Fourier transform.

According to an advantageous characteristic, the method comprises a step of channel response calculation that comprises a conversion step of the multi-carrier signal in binary representation into a representation in a base of at least two relatively prime numbers on a finite space of size equal to the product of the relatively prime numbers.

According to a particular characteristic, the conversion step used for the channel response calculation is partly or entirely common with the conversion step used in a Fourier transform and/or synchronization.

Preferably, the modal representation is an RNS or QRNS representation.

Advantageously, the multi-carrier signal is an OFDM signal.

The invention, also involves a method for transmitting a multi-carrier signal (COFDM, DMT), that comprises:

a conversion step of a source signal received in binary representation into a modal representation in a base of at least two relatively prime numbers on a finite space of size equal to the product of the relatively prime numbers, and a modulation step of a source signal using the modal representation to form the multi-carrier signal.

In addition, the invention involves a multi-carrier signal reception device (COFDM, DMT), that comprises the means to demodulate a multi-carrier signal that itself comprise the means to convert a signal received in binary representation into a modal representation in a base of at least two relatively prime numbers on a finite space of size equal to the product of the relatively prime numbers.

In addition, the invention involves a multi-carrier signal transmission device (COFDM, DMT), that comprises the modulation means comprising itself the means to convert a signal received in binary representation into a modal representation in a base of at least two relatively prime numbers on a finite space of size equal to the product of the relatively prime numbers, the modulation means modulating the source signal to form the multi-carrier signal.

4. LIST OF FIGURES

The invention will be better understood, and other specific features and advantages will emerge from reading the following description, the description making reference to the annexed drawings wherein:

FIG. 1 is a highly diagrammatical block diagram of a wireless communication system according to a particular embodiment of the invention;

FIG. 2 diagrammatically presents a transmitter/receiver of the system in FIG. 1;

Figure 4:
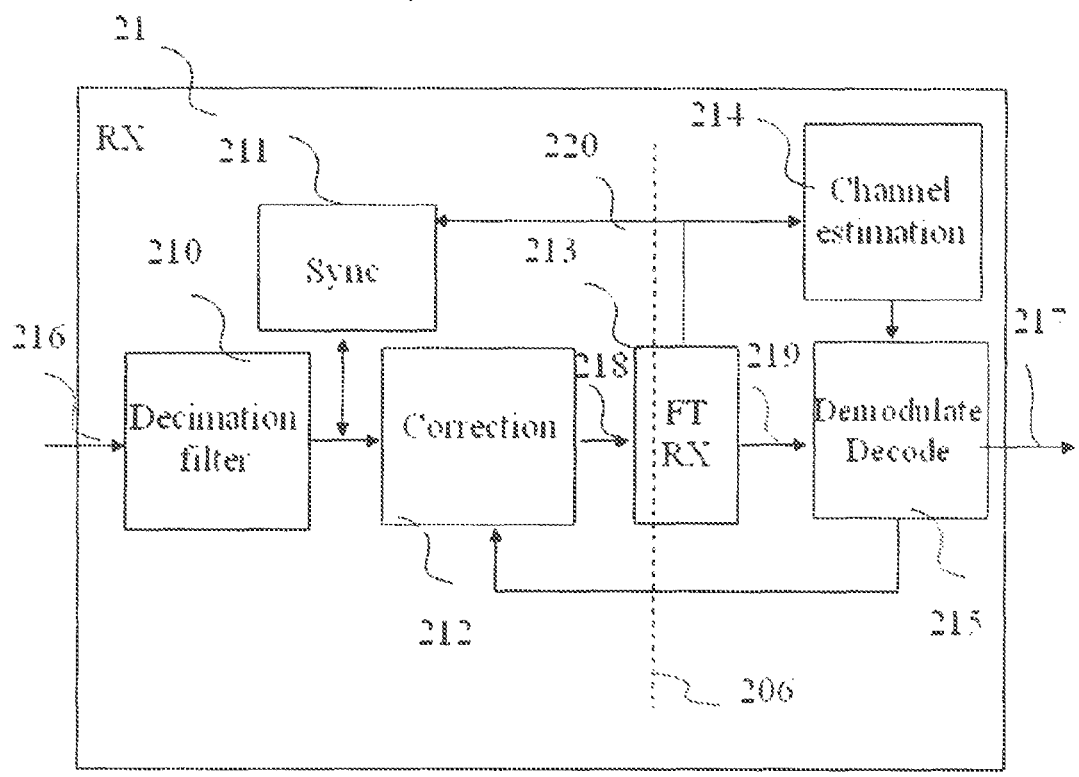
Figure 9:
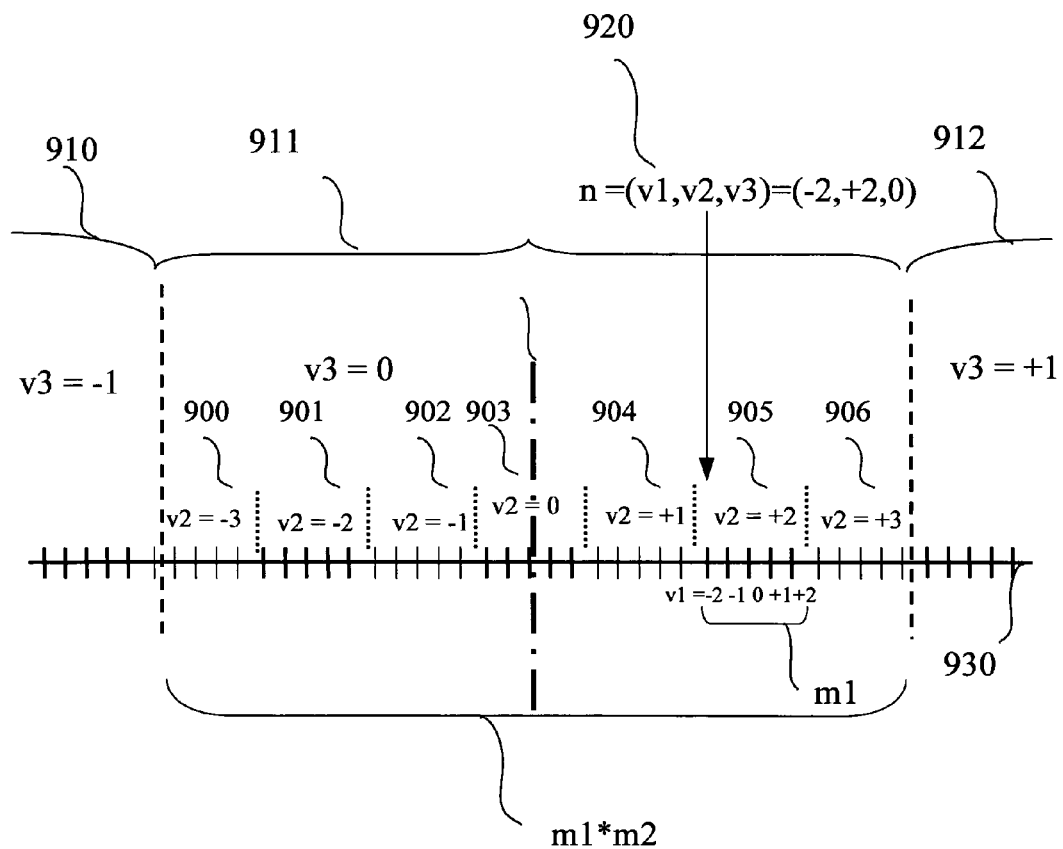
Figure 10:
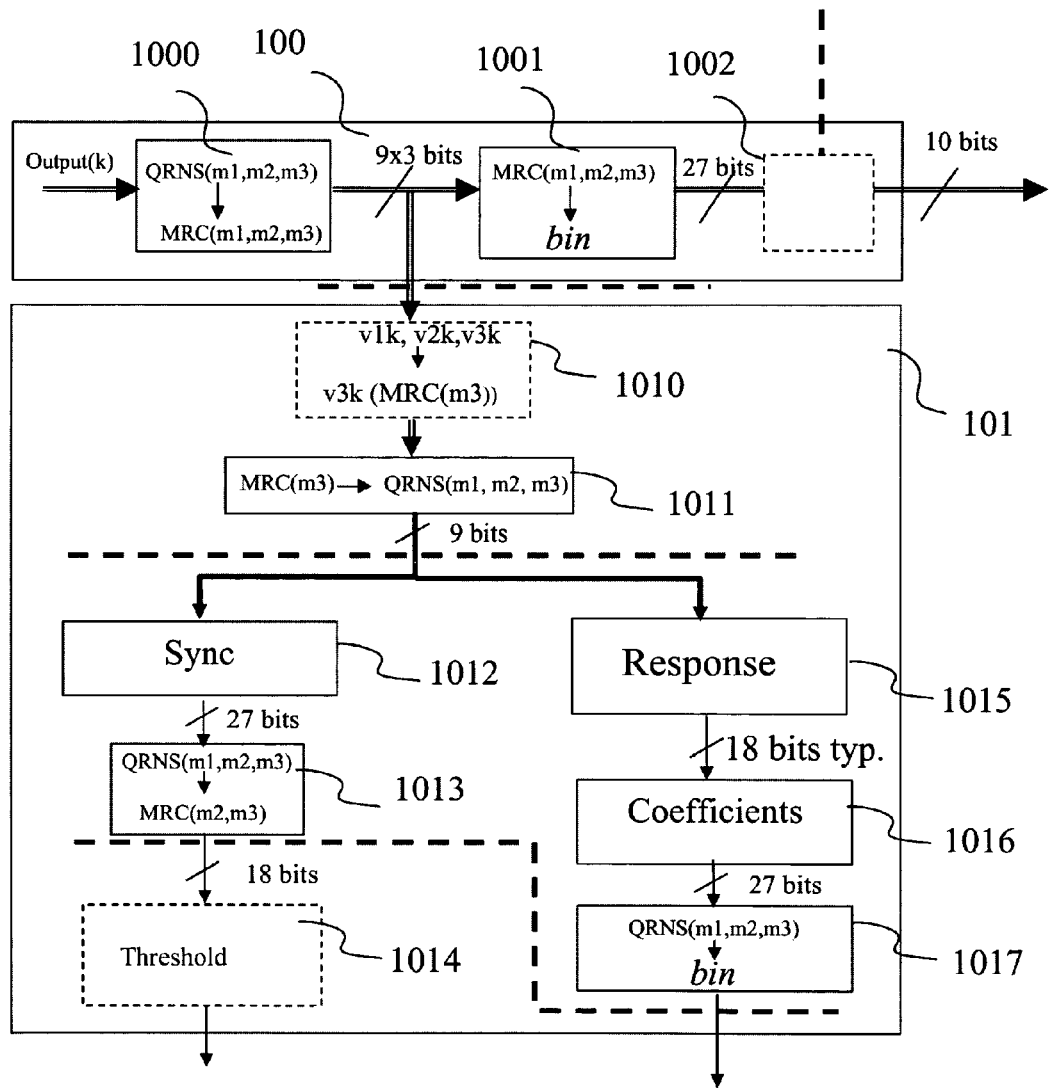

FIG. 9 diagrammatically presents an MRC representation implemented according to the invention; and FIG. 10 illustrates a synchronization and a determination of equalization coefficients implemented in the receiver module of FIG. 4.

5. DETAILED DESCRIPTION OF THE INVENTION

According to the invention, a modal representation is used to carry out signal processing calculations in a transmitter or a receiver, and particularly the Fourier transforms, a synchronization or the calculations of equalization coefficients. In particular, a modal representation is used of samples and various parameters in the formula (1) previously defined to calculate the Fourier transforms with, preferentially, relatively low N values, N being equal, for example to 256, 128 or lower values. According to the invention, the numbers are represented in a modal form that simplifies the calculations of the formula (1) and makes it possible to process N samples in parallel. Notably a modal representation is used of type RNS (Residue Number System) or a variant of type QRNS (RNS quadratic) which is based on the "Chinese remainder" theorem demonstrated in the framework of number theory. According to a modal representation, the signals are represented in a modulo base of relatively prime numbers defining this base for the operations used in a multi-carrier modulation and corresponding demodulation.

Preferentially, the numbers defining the base are preferably prime numbers in order to improve the efficiency of operations and simplify the multiplication operations.

Advantageously, the invention is applied to an OFDM modulation or demodulation that can be associated with four phase modulations QPSK (Quaternary Phase Shift Keying) or with QAM (Quadrature Amplitude Modulation).

Representation in a Prime Numbers Base.

It is useful to recall some mathematical fundamentals. It is considered that a set of prime numbers m1, m2, m3, . . . mj is called a base set and n any number. The modulo n number of elements of the base set is calculated (the "modulo i" operation is marked [i]) and a set of numbers is defined n1, n2, . . . nj, a number ni being equal to n[mi] (n modulo mi) for i understood to be between 1 and j, namely:

$$n1=n[m1], n2=n[m2], n3=n[m1], n4=n[m4], \ldots, nj=n[mj].$$

The product of the mi elements for i understood to be between 1 and j is noted as M, namely M=ml*m2*m3* . . . *mj−1 (where $$M = \prod_{i=1}^{j} mj$$

). According to the Chinese remainder theorem, j-tuple (n1, n2, nj) defines in a biunivocal manner the number n in the interval contained between 0 and the element product mi or [0, M−1]. Hence, the representations n and (n1, n2, . . . nj) are equivalent on the interval [0, M−1]. Advantageously, within the scope of the invention, n will be considered to be within an interval around 0 or [−M/2; +M/2] (to the nearest unit for higher and lower points, this interval should contain M elements).

The advantage of this representation called modal representation is that addition and multiplication type operations can be carried out separately. In fact, if a is a j-uplet (a1, a2, . . . aj) and b is a j-uplet (b1, b2, b3, bj), the sum (respectively the product) of a and b is expressed as in the form of a j-uplet where each component is expressed as the sum (respectively the product) of each of the components of a and b of the same rank in the j-uplet, as:

$$a+b=(a1+b1, a2+b2, a3+b3, \ldots, aj+bj) \text{ and}$$

$$a+b=(a1*b1, a2*b2, a3*b3, \ldots, aj*bj).$$

Hence, due to the invention, generally complex operations (Fourier transforms) are considerably simplified. As a means of illustration, if a base (n1, n2, n3, n4) has values of (251, 241, 239 and 233), each addition and multiplication operation can be carried out on eight bits without loss of precision as long as they do not exceed the product M with values 251*241*239*233* that is approximately a number of 31 bits.

This representation is not used according to the prior art, as comparative operations are not, at first glance, simple and it is therefore necessary to carry out "level clamping" to avoid "overflows". Hence, it is very difficult to easily ascertain which is the bigger number from among the two numbers (12;201;123;56) and (111;98;83;106) expressed in the base above.

In order to resolve this disadvantage, according to the invention, an intermediate representation called MRC (Mixed Radix Coefficient) is considered.

Intermediate representation.

According to the MRC representation, a number n is expressed in the form of the sum of a prime number v1, the product of a number v2 by m1 and the product of numbers v3, m1 and m2 being prime numbers as in:

$$n=v1+v2*m1+v3*m1*m2$$

More generally, $$n=v1+v2*m1+v3*m1*m2+\ldots vrm1*m2*\ldots *mj-1.$$

Hence, the number n represented in the form (v1, v2, v3) can be compared to a number n' represented in the same base (m1, m2, . . . mj) under the form (v1', v2', v3') without explicitly calculating n and m.

It is important that all the operations according to this representation do not create "overflow" or "underflow" of the considered interval containing the M elements.

Translation of a Standard Representation to a RNS Representation or Vice-Versa.

As an illustration, an example is given hereafter of a translation of a standard representation to a RNS representation in a base B (m1, m2, m3) equal to (251;241;239) or vice-versa.

The translation of a number n corresponding to an input signal on 10 bits to a representation in a base B is simple as:

$$n1=n[m1]; n2=n[m2] \text{ and } n3=n[m3].$$

In practice, these operations can be tabulated using the three "look-up" tables of 1 Kx8 bits (in PROM form for example, comprising at the n address the operation result n[mi]).

The translation of a representation in the base B to a standard representation is less simple. Either n has a value of (n1, n2, n3) in the base B and it is initially wished to express n in the interval [0,M[ as if it were in the interval [-M/2, M/2[.

The numbers p1, p2 and p3 exist such that:

$$n=n1+p1*m1, \text{ with } 0=<n1<m1 \text{ and } 0=<p1<m2*m3 \quad (1')$$

$$n=n2+p2*m1, \text{ with } 0=<n2<m2 \text{ and } 0=<p2<m1*m3 \quad (2'); \text{ and}$$

$$n=n3+p3*m1, \text{ with } 0=<n3<m3 \text{ and } 0=<p3<m1*m2 \quad (3')$$

$$n1+p1*m1=n2+p2*m2$$

Either c1, the inverse of m1 in Z/m2Z (where Z represents the set of relative whole numbers): c1*m1=1 [m2]

$$n1*c1+p1*m1*c1=n2*c1+p2*m2*c1 \quad (4')$$

therefore p1 [m2]=(n2−n1)*c1 [m2].

Or, v1=n1 on [0;m1[; v2=(n2−n1)*c1 on [0;m2[; and v3 such that p1=v2+v3*m2. In the form of an intermediate representation, there is:

$$n=v1+p1*m1=v1+(v2+v3*m2)*m1=v1+v2*m1+v3*m1*m2 \quad (5')$$

From the relationships (3') and (5'), it can be deduced that:

$$v1+v2*m1+v3*m1*m2=n3+p3*m3 \quad (6')$$

c2 is considered the inverse of m1*m2 in Z/m3Z, from which c2*m1*m2=1 [m3]

As previously, we have:

$$v1*c2+v2*m1*c2+v3*m1*m2*c2=n3*c2+p3*m3*c2$$
and $$v1*c2+v2*m1*c2+v3=n3*c2[m3] \text{ from which:}$$

$$v3=(n3-v1-v2*m1))*c2$$

Considering the coordinates MRC v1, v2 and v3 as signed numbers on their respective modulos, it is reduced to the interval [−m1*m2*m3/2;m1*m2*m3/2[.

A hardware embodiment implements, for example, one of the following sequences that drive the resulting numbers higher and higher after each of the three passes. The constants are preferably pre-calculated.

Namely n=(n1, n2, n3).

The following numbers are defined or calculated:

X=v1=n1 (no operation),

Y=v2*m1=(n2−n1)*c1*m1 on [0;m2*m1[, or in practice a subtraction on 8 or 9 bits according to the example given, a multiplication by a constant c1*m1 and an intermediate result in approximately 16 to 18 bits, Z=v3*m1*m2=(n3−v1−Y)*c2*m1*m2, or in practice a double subtraction on 16 to 18 bits according to the example given, a multiplication by a constant c2*m1*m2, an intermediate result in approximately 25 to 28 bits.

Hence, an MRC representation of the number n in the form of (v1, v2, v3) is obtained.

FIG. 9 illustrates an MRC representation of type (v1, v2, v3) with m1 having a value of 5, m2 having a value of 7 and m3 another prime number with 5 and 7.

The graduated axis 930 illustrates the succession of n numbers, by unit step. Three zones 910 to 912 can be defined corresponding to zones where v3 has values of respectively −1, 0 and +1. Each of these zones 910 to 912 is divided into sub-zones corresponding to a given value of v2, the value of v2 rising when n increases within the zones 910 to 912. Hence the zone 911 is divided into 7 zones 900 to 906 corresponding respectively to v2 going from −3 to +3. Inside each of the divided zones corresponding to a given value for v2, are found the graduations of the axis 930 corresponding to a given value of v1, the value of v1 rising when n increases inside one of the zones for the given values of v2 and v3. Hence, the zone 905, corresponding to (v2, v3) having a value of (2, 0) comprises five successive graduations corresponding to v1 going from −2 to +2. As a means of illustration, the number n corresponding to the reference 920 corresponds to the first graduation on the axis 930 in the zones 905 and 911 and can therefore be represented in the form (v1,v2,v3)=(−2, +2, 0). In summary, each v2 and v3 zone comprises m1 n values. Each v3 constant zone comprises a product m1*m2 n values. The interval set comprising M=m1*m2*m3 values.

It is noted that it is then easy to compare two numbers represented in MRC form, as it suffices firstly to compare the corresponding v3 values, and if the v3 values are equal, to compare the v2 values and if the v2 values are also equal, to compare the v1 values.

To return to a binary representation, n is equal to the sum of X, Y and Z (or n=X+Y+Z), which in practice corresponds to three subtractions on 26 to 19 bits. The result can then be rounded off (for example to 10 or 12 bits).

Preferentially, multiplication is not implemented. In fact, the numbers are multiplied by the constants. Hence, the multiplications are preferably implemented by the pre-calculated (look-up) tables or the adders.

Numbers Base.

According to a modal representation implemented in the invention, of type RNS, the base used to represent the signals comprises the relatively prime numbers two by two. Preferentially, the base used comprises prime numbers in principle.

Advantageously, the base numbers are expressed in the form of a multiple of 4 plus 1 (or 4p+1) (for example 229, 233 and 241 are numbers from this form that can be coded on 8 bits). In fact, a multiplication of complex numbers that usually comprise two multiplications and two additions of real numbers is reduced, using such a base to a simple conversion between inputs and outputs, called QRNS ("Quadratic RNS"). In fact, according to an RNS, the pure real and pure imaginary parts of an input signal are converted separately into pure real RNS representation and pure imaginary RNS representation. According to a QRNS, this conversion is "cross-coupled". More precisely, if every component of a complex number xr+j*xi is converted into real bases r1, r2 and r3 and imaginary bases j*i1, j*i2 and j*i3 in RNS. Then in QRNS, in Z/mlZ (l being 1, 2 or 3), this number is represented in the form (Xi, Xi') where:

Xi is the sum of xr and a product of q by xi (Xi=xr+ql*xi [ml]),

Xi is the difference between xr an a product of q by xi (Xi=xr−ql*xi [ml]), and ql is the root of −1 in Z/mlZ.

Hence, according to the invention, a RNS or QRNS representation enables construction of a Fourier transform core with very low latency and with rapid sequencing producing, for example, an output result for every input sample. A modal representation (RNS and/or QRNS) is also implemented advantageously to carry out a preamble synchronization as well as the calculation of the equalization coefficient.

DETAILED DESCRIPTION OF AN EMBODIMENT

Figure 1:
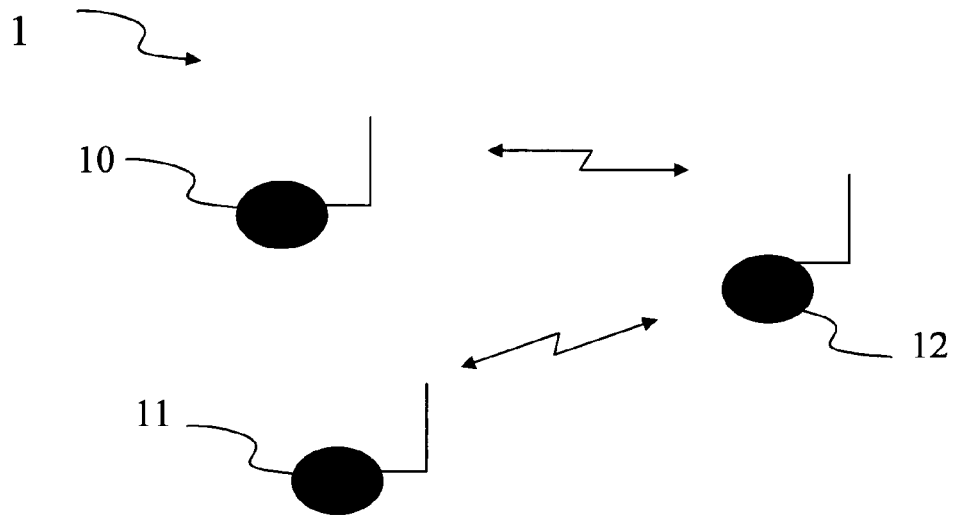

FIG. 1 presents a diagram of a wireless communication system 1 according to a particular embodiment of the invention.

The system 1 comprises the terminals and/or relay stations 10 to 12 implementing an OFDM type modulation.

Figure 2:
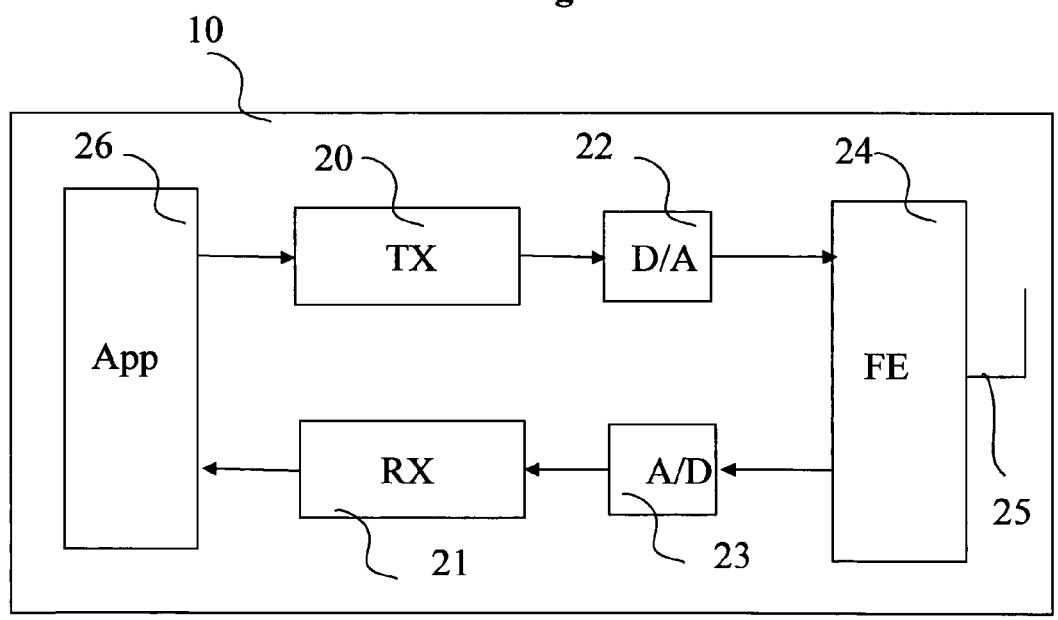

FIG. 2 diagrammatically shows a transmitter/receiver 10 of network 1 and more precisely the parts corresponding to the physical layer.

The transmitter/receiver 10 comprises:

a module 26 corresponding to a application and assuring the interface with the physical layer;

a transmitter module 20 receiving data to be transmitted from module 26;

a digital/analogical converter 22 converting into an analogical signal, a digital signal received from the transmitter module 20;

a radio front-end 24 connected to an antenna 25 charged with the transmission of signals from the converter 22 and the reception of signals transmitted by other OFDM transmitters 11, 12 of system 1, to a converter 23;

the analogical/digital converter 23 receives an analogical signal from the radio front-end 24;

a receiver module 21 receiving the signal received by the radio front-end and digitized by the converter 23 decoding it to transmit a useful data signal to module 26.

Figure 3:
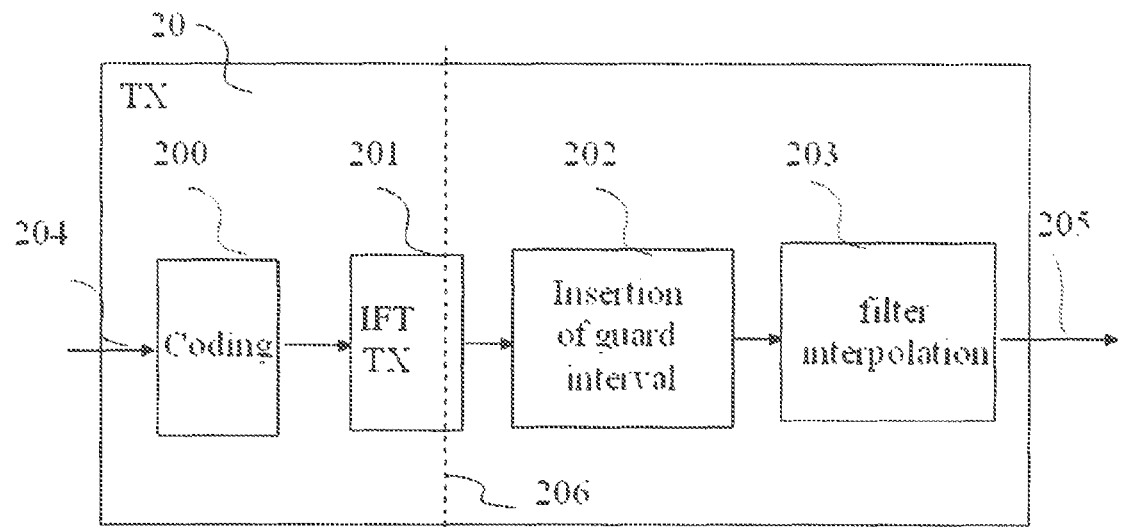
FIGS. 3 and 4 illustrate respectively an OFDM transmitter module and an OFDM receiver module implemented in the transmitter/receiver module of FIG. 2.

FIG. 3 illustrates the OFDM transmitter module 20 that comprises:

a coder 200 that codes a data input signal with a channel code (for example Reed-Solomon, convolutional, turbo-codes, etc.) from module 26 via a link 204;

an IFT operator 201 carrying out an inverse Fourier transform on the signal coded by the coder 200 and supplying the OFDM symbols;

a guard interval insertion module 202 in the OFDM symbol flow received from the IFT operator 201 to facilitate the synchronization on the receiver side; and an interpolation filter 203 receiving the OFDM symbol flow with guard interval from module 202 and transmitting the filtered signal to the converter 22 via a link 205 (the interpolation filter facilitates respect for the filter templates realized by the transmission module).

FIG. 4 illustrates the OFDM receiver module 21 that comprises:

a decimation filter 210 (performing the inverse operation to the interpolation filter) receiving a signal corresponding to an OFDM frame from converter 23 via a link 216 (this signal received by interface 24 and corresponding to a frame with preamble being generally degraded and noisy after passage in the transmission channel containing noise and submitting the signal to multiple echoes);

a synchronization module 211 performing a synchronization of the signal filtered by filter 210 using the preamble of a received frame and an automatic gain control, synchronization information supplied by a demodulator 215 enabling refinement of the synchronization if necessary;

a frequency correction module 212 correcting the frequency of the signal synchronized by module 211, correction information supplied by the demodulator 215 enabling refinement of the frequency correction if necessary;

an FT operator 213 performing a Fourier transform on the OFDM symbols transmitted by the module 211 (these symbols being present in the signal received by the module 212) and supplying a signal corresponding to the reference data to a channel estimator 214 and a signal corresponding to the data to decode at the demodulator 215;

the channel estimator 214 that calculates a channel response on the basis of reference symbols supplied by the operator 213 and the equalization coefficients then supplies them to the demodulator 215; and the demodulator 215.

The demodulator 215 demodulates the signal of data to be decoded supplied by the operator 213 using the channel response and the equalization coefficients supplied by the estimator 214, and a synchronization aided by the pilots inserted in the OFDM signal. In addition, the demodulator 215 de-interlaces the data (dual interleaving operation carried out on the transmission side) and decodes the de-interlaced data (following a dual coding operation carried out on the transmission side, using, for example, a Viterbi algorithm if the data has been coded with a convolutional code). Finally, the demodulator 215 supplies the decoded data to module 26 via a link 217 and a frequency correction information to module 212.

The physical layer is thus divided into a temporal domain (after IFT operator 201 or before FT operator 213) directly linked to the converters 22 or 23 and into a frequency domain (before IFT operator 201 or after FT operator 213) that supports the signal processing operations (the separation between the two domains being symbolized by the dotted line 206).

According to the invention, the IFT 201 and FT 213 operators, the synchronization module 211 and the estimator 214 calculating the correction coefficients perform all or some of the operations using RNS, QRNS and/or intermediate signals representation. Hence, advantageously, the OFDM core implemented in modules 20 and/or 21 is reduced in size and complexity, is more efficient and consumes less energy.

Remember that an FT at N points (having a value of for example of 256) involves taking N complex inputs (the $i^{th}$ input being noted input (i)) and supplying N outputs (the $k^{th}$ output being noted output (k) as defined hereafter:

$$\text{Output}(k) = \sum_{i=-N/2+1}^{N/2} \text{input}(i) * \exp(-2ji\pi k/N) \quad (1)$$

Using this expression, according to the invention, the size of the result (in the number of bits) is lower than with the successive passes known as butterfly. Hence, if the input signal and the exponential factors keep to 10 bits, the results keep only to 20 bits to which are added a few bits for the sum (typically 6 at most for an FT at 256 points). Hence, this is possible with an RNS base having a value (241; 233; 229).

The numbers of the base are preferably close to a power of 2 (here 256) to take advantage of the highest dynamic while at the same time limiting the number of bits (here 8). According to a variant, we can also use numbers coded on 9 bits, if the implementation cost is acceptable.

As previously indicated, the base numbers are mutually prime. Preferably, the base numbers are prime in order to draw on the work of "Gallois Field" as explained hereafter.

The finite ordered set $\{0, 1, 2, \ldots, m1-1\}$ on which a number is defined is called $Z/m1Z$. This set is called Gallois Field if m1 is a prime number. In particular, there exists at least one element, called the primitive element, marked a, for which the successive powers cover the integrality of $Z/m1Z$ except 0. There is:

$Z/m1Z^* = \{a^{}1, a^{}2, a^{}3, \ldots a^{}m1\}$ (order m1-1) (the operator ** designating an increase in the power)

$(Z/m1Z^* = Z/m1Z - \{0\}).$

It can be deduced that if $b=a^{}ex$ et $c=a^{}ey$, then $b*c=a^{**}ex*a^{}ey=a^{}(ex+ey)$.

Hence, by representing the numbers x and y by their exponent, the multiplication is replaced by an addition and the result can be obtained by carrying out the inverse representation operation. An electronic system can implement these operations using an adder and a look-up table for the representation conversion operations. According to the invention, the calculations of the relationship (1) are implemented using this method. In particular, an operator Log can be defined on $Z/m1Z$, inverse of the power function of the primitive element on $Z/m1Z$ (if $b=a^{}ex$, then $\text{Log}(b)=ex$). Likewise, the power function of a is called in the following exponential function in $Z/m1Z$ (if $b=a^{}ex$, $\exp(ex)=b$).

Figure 5:
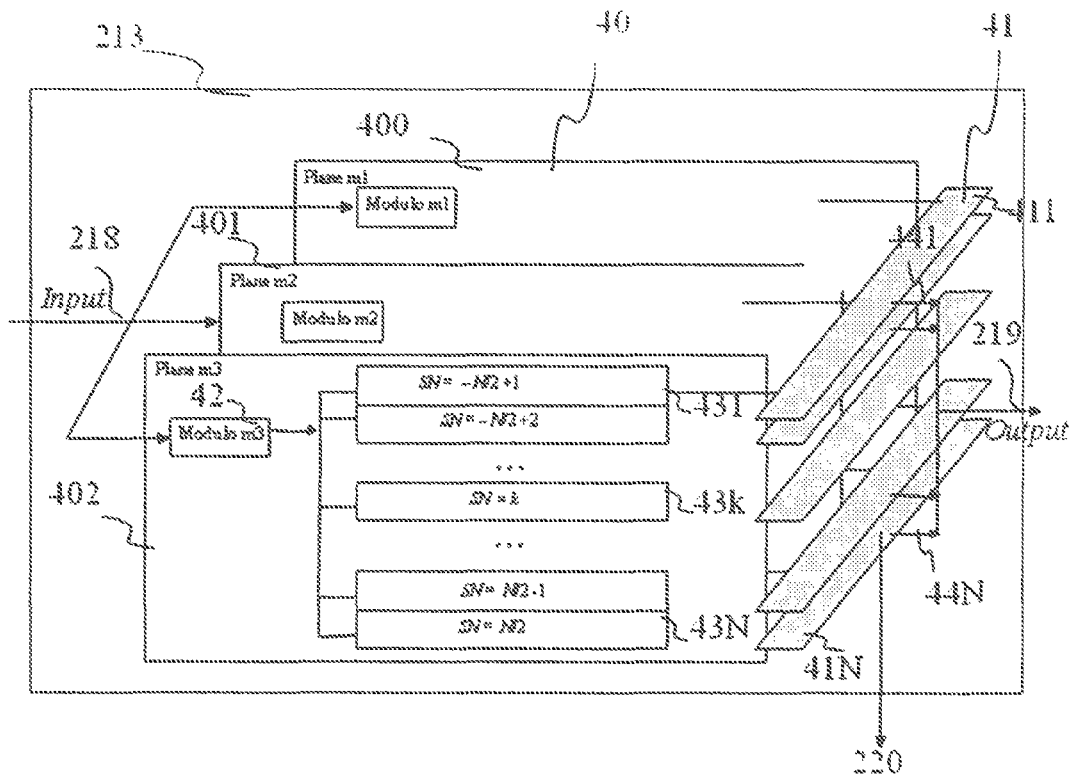
FIGS. 5 and 6 are conceptual illustrations of an FFT module implemented in the receiver module of FIG. 4.

FIG. 5 illustrates the architectural design of the operator FT 213 implementing a QRNS representation of signals, the FT operation (to the nearest constant) according to the relationship (1) noted hereafter with a value of i between 0 and N−1 (when a Fourier transform is begun on an OFDM symbol, the first sample is numbered 0 and the last N−1 when the guard interval has been removed):

$$\text{Output}(k) = \sum_{i=0}^{N-1} \text{input}(i) * \exp(-2ji\pi k/N) \quad (1)$$

As an illustration, it is assumed that the RNS base comprises three numbers m1, m2, and m3 coded on 9 bits. The operator 213 accepts at input a digital signal comprising N input(i) samples with i between 0 and N−1 and input(i), according to a binary representation, with a direct correspondence between the signal magnitude and its representation.

The operator carries out the operations in parallel diagrammatically shown according to three planes 400 to 402 associated respectively with m1, m2 and m3.

Initially a conversion of the received signal in a QRNS base is carried out. Hence, in the planes 400 to 402, initially the modulo Input(i) signals respectively m1, m2 and m3 are represented.

According to variants of the invention, there are more than three vectors in the base, for example there can be 4, 5 or 6 vectors.

Then, in each plane, for each $k^{th}$ SN sub-carrier (the sub-carriers being numbered from −N/2+1 to N/2), the formula $$\text{Output}(k) = \sum_{i=0}^{N-1} \text{input}(i) * \exp(-2ji\pi k/N)$$

is calculated. Hence for the plane 402 corresponding to m3, there is after a conversion 42, modulo m3, N branches 431 to 43N of calculations in parallel, the $k^{th}$ calculating $$\text{Output}(k) = \sum_{i=0}^{N-1} \text{input}(i) * \exp(-2ji\pi k/N)$$

modulo m3 accumulating the product result to obtain the sum with i varying from 0 to N−1 over the period of the OFDM symbol. It is recalled that the exponential notation of a complex number (jα) corresponds to the complex number of module 1 and the argument α namely $\cos\alpha + j\sin\alpha$.

For each sub-carrier, its expression is obtained in a modal representation (RNS or QRNS), each plane for a branch of the same rank producing a component in modal representation.

Then, a conversion is carried out 411 to 41N to a binary representation to produce a binary result on the outputs respectively 441 to 44N corresponding to the output 219 (symbolic concatenation of outputs 441 to 44N) the conversion passing by an intermediate representation MRC. The intermediate representation MRC is transmitted on an output 220.

All the branches of the output 410 to 41N terminate with a block that enables a binary representation to be easily obtained. There is no big processing block (particularly, these operations can be implemented with look-up tables performing the multiplications by constants and additions). According to a variant, the output step is factorized for all or some of the output steps, according to the requirements of outputs 219 and/or 220, using a reduced number converters of modal mode to MRC then to a binary mode, in order to simplify the implementation.

Figure 6:
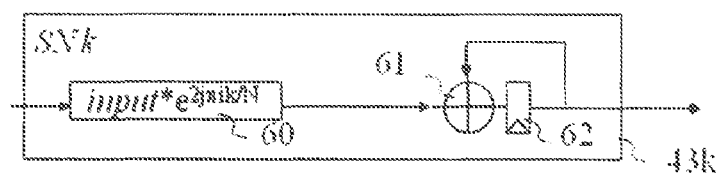

An implementation of the operation 43k is illustrated with respect to FIG. 6.

The branch 43k comprises a look-up table type operator 60 that carries out the operation $$\text{Output}(k) = \sum_{i=0}^{N-1} \text{input}(i) * \exp(-2ji\pi k/N)$$

using the successive inputs corresponding to input(i). The operator 60 supplies an initial adder 61 input.

The output of adder 61 supplies an accumulator register 62 that retains the data present at input on the rising edge of a command signal (typically a clock synchronized with the arrival of samples). The register output corresponds with the output of branch 43k and feeds the second input of the adder 61.

The calculations carried out in the branches 430 to 43N and 410 to 41N are extremely rapid as they are performed in modulo mx on few bits (for example 8 or 9). Also, according to a variant embodiment of the operator 213, in order to reduce the complexity of a component implementing it, some branches are grouped together and the calculations corresponding to several branches are carried out by the same branch in a sequential manner. As an illustration, for an implementation in the framework of a reception of a signal according to the standard IEEE802.16a, an input sample can arrive at a rate of 5 MHz, whereas the processing of the sub-carriers is at 80 MHz or at a much higher speed (for example 160 MHz) so that 16 sub-carriers (or 32 with a clock frequency at 160 MHz) can be processed sequentially without slowing down the processing at reception.

There is a symmetry between the respective calculations of the sub-carriers k and −k. Also, in practice, N/2 calculations are carried out (corresponding, for example, to N/2 first branches) in fact, the expression $\exp(-2ij\pi k/N)$ is inverse to $\exp(-2ij\pi(-k)/N)$, the intermediate results of the branch corresponding to k being reused by the corresponding branch at (−k).

Moreover, a lateral part of the COFDM spectrum is not used and, hence, the corresponding part of the FT is not used (to avoid interference between channels). Hence, according to a variant of the embodiment, only 80% of the sub-carriers are calculated, namely 200 instead of 256 (corresponding, for example, to a 256 carrier OFDM transmission as specified in the standard IEEE802.16). In fact, in the OFDM spectrum, the sides of the spectrum are not used (there is a frequency guard with respect to neighbouring frequencies.

Figure 7:
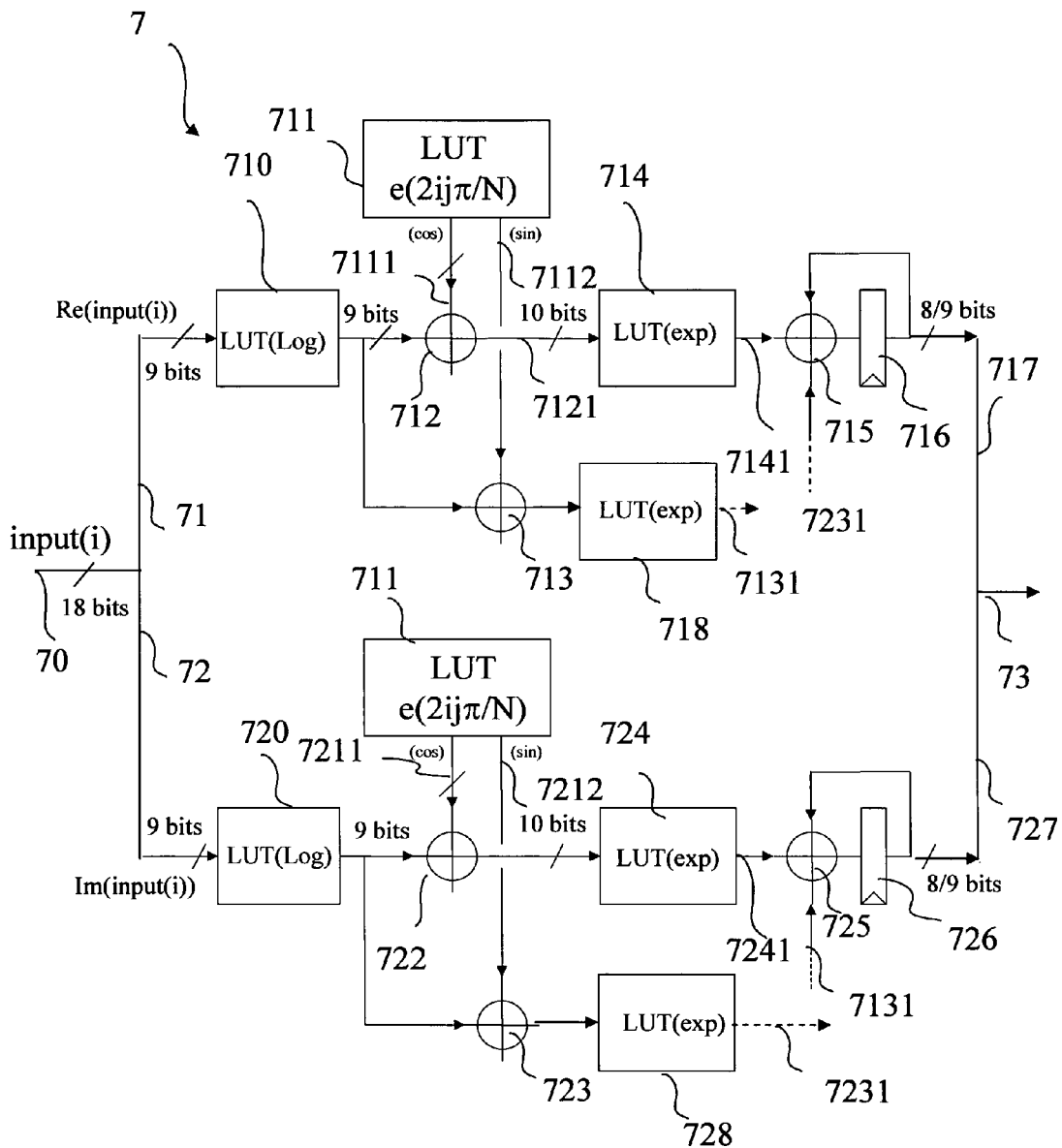
FIG. 7 shows in detail a Fourier transform module implemented in the receiver module of FIG. 4.

FIG. 7 details a hardware embodiment of a branch 7 corresponding to a branch 431 to 43N and for which a diagrammatic representation was given in respect of FIG. 6.

The operation carried out (explained hereafter in RNS for more clarity) is:

$$\text{Output}(k) = \sum_{i=-N/2+1}^{N/2} \text{input}(i) * \exp(-2ji\pi k/N) \quad (1)$$

It is noted that Re(x) the real part of a complex number x and Im(x) its imaginary part (namely x=Re(x)+j*Im(x)).

Hence, the relationship (1) is sub-divided into 2 relationships:

$\text{Re}(\text{Output}(k)) =$ $$\sum_{i=-N/2+1}^{N/2} \text{Re}(\text{input}(i)) * \cos(-2i\pi k/N) - \text{Im}(\text{input}(i)) * \sin(-2i\pi k/N)$$

and $\text{Im}(\text{Output}(k)) =$ $$\sum_{i=-N/2+1}^{N/2} \text{Re}(\text{input}(i)) * \sin(-2i\pi k/N) + \text{Im}(\text{input}(i)) * \cos(-2i\pi k/N)$$

The implementation is carried out in QRNS.

Branch 7 comprises an input(i) 70 on 18 bits that subdivides into 2 branches 71 and 72 corresponding respectively to Re(input(i)) and Im(input(i)).

Branch 7 comprises a look-up table 710 (respectively 720) enabling the conversion of the input (Re(input(i))) 71 (respectively Im(input(i))) 72) into its Log value on 9 bits.

The output of table 710 (respectively 720) and the real part of an output from a look-up table 711 comprising the pre-calculated values of $\exp(j*2\pi*i/N)$ in Z/mZ supply an adder 712 (respectively 722).

The output of table 710 (respectively 720) and the imaginary part of the output from the look-up table 711 supply an adder 713 (respectively 723).

The output of the adder 712 (respectively 722) on 10 bits addresses a look-up table 714 (respectively 724) enabling the conversion of the input and its modulo m to which an exp operator is applied. In the output of table 714 (respectively 724), we have the real part (respectively imaginary) of input (i)*cos( ).

The output of the adder 713 (respectively 723) on 10 bits addresses a look-up table 728 (respectively 718) enabling the conversion of the input and its modulo m to which an exp operator is applied assigned with a factor (−1) (respectively +1). In the output of table 728 (respectively 718), we have the imaginary part (respectively real) of input(i)*sin( ).

The sine operators (or sin( ) and cosine (or cos( ) are represented on integer values comprised between −m and m so they can be processed in Z/mZ (it is assumed that an m factor is assigned to the sine and cosine so that cos(0) is equivalent to m).

The output of tables 714 and 728 (respectively 724 and 718) feeds an adder 715 (respectively 725) whose output is recorded in a register 716 (respectively 726) on a command signal (typically a clock rising edge).

The register output 716 (respectively 726) also feeds the adder 715 (respectively 726). In output, when the N input(i) values from −N/2+1 to N/2 have covered branch 7, the register 716 (respectively 726) presents on the output 717 Re(Output(k)) (respectively 727 Im(Output(k)). The outputs 717 and 727 are combined in an output 73 to form a complex Output (k).

There is no multiplier in branch 7 which is therefore relatively simple to implement.

Moreover, a carrier offset correction can merge with the factors exp( ) something which is not possible with a butterfly type FFT.

Various offset corrections to different sub-sets of sub-carriers, can be applied at no extra cost, which can be useful in an OFDMA (OFDM-Access) receiver. In fact according to the invention, the operator exp( ) tables 714, 724, 718 and 728 can be changed to carry out a frequency correction. A particular frequency in the OFDM spectrum can also be corrected, if required. This can be useful in systems where there may be several sources of multi-carrier transmission, particularly in OFDMA systems (for example in a IEEE802.11 system that uses the OFDMA (the OFDM spectrum is shared between several destinations). In this case, a receiver and/or a transmitter can apply the frequency corrections according to the source. (which is not possible when carrying out an FFT according to the prior art).

Figure 8:
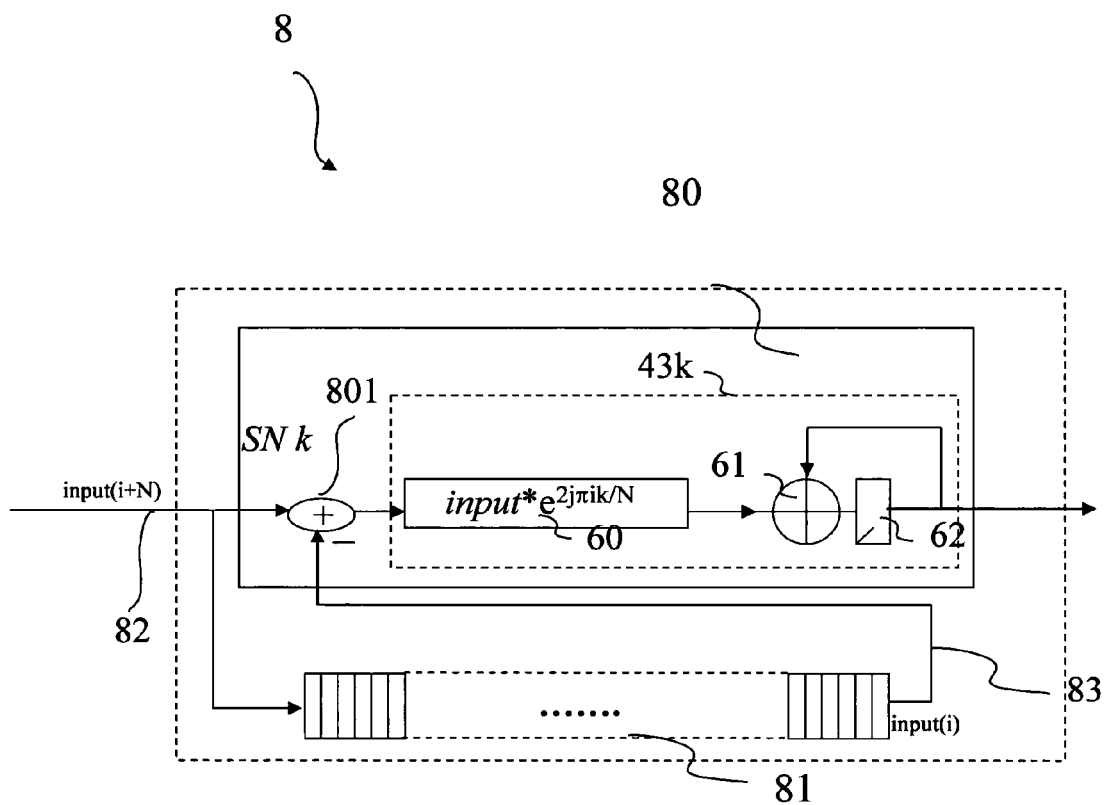
FIG. 8 illustrates a Fourier transform module with sliding window according to a variant of the invention.

FIG. 8 shows an implementation of a branch 8 with a sliding Fourier transform in order to have an output at every clock cycle, according to an embodiment variant of the invention. The branch 8 replaces any one of the branches 431 to 43N in the module 213, with parameters specific to the carrier considered (parameter value k) and a plane containing the branch (m having a value m1, m2 or m3). This variant enables a continuous Fourier transform to be obtained as the input(i) samples arrive at the branch 8.

This variant can advantageously be implemented in a synchronization module or an SDR (Software Defined Radio), or a cognitive radio where the entire spectrum is not known and where the spectrum is used when available. In fact, this variant enables a frequency analysis to be made of input signals and/or to be on standby while waiting for a signal on which the receiver can be synchronized. In the scope of an OFDM signal reception, a sliding Fourier transform can notably be implemented according to the invention to avoid a rough synchronization when the receiver is waiting for a preamble and directly carry out a fine and precise synchronization. Returning to the formula, applied to the instant L:

$$\text{Output}(k) = \sum_{i=L}^{L+N-1} \text{input}(i) * \exp(-2ji\pi k/N) \quad (1)$$

It can be said that Output(k) represents the Fourier transform at the instant L on a phase frame equal to $\exp(-jL \cdot \pi k/N)$, that is with a phase difference increasing in a linear manner from rank k.

It can be deduced from this that:

$$\text{Output}(k) = \text{input}(L)\exp(-2jL\pi k/N) + \sum_{i=L+1}^{L+N-1} \text{input}(i) * \exp(-2ji\pi k/N)$$

Then:

$$\text{Output}(k) - \text{input}(L)\exp(-2jL\pi k/N) +$$
$$\text{input}(L+N)\exp(-2j(L+N)\pi k/N) =$$
$$\text{Output}(k) - \text{input}(L)\exp(-2jL\pi k/N) + \text{input}(L+N)\exp(-2jL\pi k/N) =$$
$$\text{Output}(k) + (-\text{input}(L) + \text{input}(L+N))\exp(-2jL\pi k/N) =$$
$$\sum_{i=L+1}^{L+N} \text{input}(i) * \exp(-2ji\pi k/N)$$

A relationship can be deduced between the outputs of Output(k) corresponding respectively to the instant L (noted as t=L) and to the following instant L+1 (noted as t=L+1):

$$\text{Output}(k)_{(t=L)} + (-\text{input}(L) + \text{input}(L+N))\exp(-2jL\pi k/N)$$
$$= \text{Output}(k)(t=L+1)$$

This mechanism therefore enables the calculation of Output(k) at instant L+1, that is to say at the TF at time L+1 with a linear frame reference according to rank k equal to $\exp(-j(L+1) \cdot \pi k/N)$. FIG. 8 illustrates an implementation taking into account the relationship between the outputs at times L and L+1. In short, implementing a delay line 81 with a depth of N samples, there is a Fourier transform output at each time with the restriction that the output will be given in a frame with a ramp of linear phase rising the length of the spectrum and whose slope is increased at each new output. According to the use of the Fourier transform outputs, abstraction of this frame if required can be done in the following processing step (for example in the equalizer or the synchronization modules).

Hence, the input(i) successive samples present at the input 82 supply at the same time a subtracter 801 (by the positive input) and the delay line 81 offsetting the signal by N clock cycles. The delay line output 81 corresponding to input (i) offset by N clock cycles supplies the negative input of the subtracter 801.

The subtracter output 801 corresponding to the difference between the input(i) inputs at respective instants L+N and L (or input(i+N)−input(i)) supplies a similar module at branch 43k previously described.

FIG. 10 illustrates a synchronization and a determination of the equalization coefficients implemented in applying a modal representation of signals according to the invention. FIG. 10 particularly defines the types of representation implemented (modal, intermediate and binary) and the different conversions.

A COFDM motor also comprises the synchronization blocks, an AGC command, preamble detector, a calculation channel pulse response and calculations of equalization coefficients. It is difficult to carry out these operations in a modal representation on the same domain, because the automatic gain control and the preamble involve numbers relative to a power (that is to sums of squares of signal power), which causes a large number of bits and the pulse response often requires the calculation of two successive transforms, which also leads to a large number of bits. Also, according to the invention, the synchronization processing preferentially takes into account the intermediate representation supplied by the operator 213 prior to conversion into binary representation.

Typically, the operator output 213 corresponds to the set of outputs Output(k) corresponding to each sub-carrier k varying from −N/2 to +N/2. An Output(k) is therefore defined by three numbers m1k, m2k, m3k in QRNS representation with the base (m1, m2, m3) or by three numbers v1k, v2k and v3k in intermediate representation such that output(k) has a value of v1k+m1*v2k+m1*m2*v3k. Advantageously, in order to reduce the significant number of bits, only the most significant coordinate in intermediate representation is conserved (which means the output of the product m1*m2*v3k is rounded off and the scale is changed in dividing by the product of m1*m2).

The block 100 of FIG. 10 illustrates the Fourier transform operator output step 213 that comprises:
- a converter 1000 converting a signal Output(k) represented in QRNS in the base (m1, m2, m3) to a MRC representation on 3×9 bits;
- a converter 1001 converting the signal Output(k) represented in MRC from converter 1000 into a binary representation; and
- the identification 1002 of the most significant bits to reduce to 10 bits the scale of the signal Output(k) represented in binary form, the signal thus obtained supplies the demodulator 215.

The operator 1002 as well as all the operators of FIG. 10 shown by dotted lines correspond to the signal correspondences, they are trivial and their implementation costs nothing.

The converter 1000 supplies a block 101 for synchronizing and calculating equalization coefficients, that comprises:
- a recognition 1010 of the most important component from Output(k) represented in MRC or v3k;

a converter 1011 converting the component v3k of Output (k) into QNRS in the base (m1, m2, m3), the output of the converter 1011 being on 9 bits;

a synchronization sub-block; and a channel pulse response coefficient calculation sub-block.

The synchronization sub-block (particularly light without a multiplier) is fed by Output(k) supplied by the converter 1011 and comprises:

a synchronization module 1012 fed by the converter 1011 and that carries out a squared frequency sum of the input signal, the result being on 27 bits;

a converter 1013 converting the signal from the synchronization module 1012 represented in QRNS in the base (m1, m2, m3) to a MRC representation, the result being on 18 bits;

an identification 1014 of the most significant bits to reduce to 8 bits the scale of the synchronization signal Output (k) represented in binary form, the signal thus obtained feeds the AGC module.

The synchronization search in the frequency domain assumes the implementation of a sliding window Fourier transform such as illustrated in FIG. 8.

The synchronization module 1012 carries out a simple frequencies sum for the AGC type use and a weighted sum according to a pattern for a preamble detection.

For an AGC type operation, there is no need to return to a binary representation, a gains conversion table can be addressed directly by an MRC representation.

The invention enables a noise reduction by frequency filtering as it suffices to omit certain frequencies.

The calculation sub-block of the channel pulse response coefficients is fed by Output(k) corresponding to an known OFDM symbol emitted by the converter 1011 and comprises:

a module 1015 for partial inverse Fourier transform calculation enabling determination of the channel pulse response, the result being on 18 bits;

a module 1016 for partial Fourier transform calculation supplied by the module 1015 and supplying a result on 27 bits; and a converter 1016 fed by the module 1016 and converting the input signal represented in QRNS into a binary signal.

For the calculation of the pulse response coefficients, partial Fourier transforms are preferentially carried or by modules 1015 and 1016, on typically a quarter or less of a complete Fourier transform, which can be easily carried out in modal representation with a brute force type calculation that is possible in contrast to an FFT of the prior art using the butterfly figure. Here, a partial inverse Fourier transform calculates the weakest temporal components (only these components being significant for a pulse response).

According to the invention, the transmitter implements an inverse Fourier transform in the IFT operator 201. The IFT operator has a structure similar to that of the Fourier transform operator 213 implemented in the receiver, only the nature (here frame data to be transmitted that can be placed on a constellation corresponding to a modulation), for example, in four phases or QPSK (Quaternary Phase Shift Keying) or QAM (Quadrature Amplitude Modulation) and the number of bits (lower) from input(i), change in the inverse Fourier transform formula:

$$\text{Output}(k) = \sum_{i=L}^{L+N-1} \text{input}(i) * \exp(+2ji\pi k/N) \quad (1'')$$

Naturally, the invention is not limited to the embodiments previously described.

In particular, the invention is compatible with wireless communications using multi-carriers and particularly with transmission or reception (and the corresponding devices) implemented in local wireless network systems, long or short distance mobile or fixed networks, or point-to-point communications. In particular, the invention can be applied within the framework of the IEEE 802.16-2004 standard for fixed and nomadic networks and future evolutions (called IEEE 802.16e). Additionally, the invention is also compatible with wire transmissions using a multi-carrier modulation (notably OFDM and DMT), such as communications by powerline or xDSL.

According to a variant of the invention, a modal representation is only used in part of the multi-carrier signal receiver motor and only part of the blocks for Fourier transform, synchronization, automatic gain control, preamble detection, channel pulse response calculation and calculations of equalization coefficients implemented in a modal representation.

The invention claimed is:

1. A method of receiving a multi-carrier signal, having a demodulation step of the multi-carrier signal, the demodulation step comprising the steps of:

converting the multi-carrier signal in binary representation into a representation in a base of at least two relatively prime numbers on a finite space of size equal to the product of the relatively prime numbers, and for each relatively prime number, calculating a sliding window Fourier transform of the multi-carrier signal in modal representation projected onto the space generated by said number for at least a part of the carriers of the multi-carrier signal, known as the one-dimensional modal space calculation step, and synchronizing a receiver with the multi-carrier signal based on said calculated sliding window Fourier transform.

2. Method according to claim 1, further comprising converting the signal resulting from the one-dimensional modal space calculation step into a binary signal.

3. Method according to claim 1, wherein said step of one-dimensional modal space calculation comprises Fourier transform calculation steps for each carrier of the multi-carrier signal.

4. The method according to claim 3 wherein said calculation of one-dimensional modal space comprises a differentiated frequency correction according to the carrier considered.

5. Method according to claim 1, wherein said step of one-dimensional modal space calculation comprises the Fourier transform calculation steps for a reduced number of carriers of the multi-carrier signal.

6. Method according to claim 1, further comprising a signal conversion of a modal representation into an intermediate representation so as to enable a comparison of signal values.

7. Method according to claim 1, further comprising calculating a channel response by converting said multi-carrier signal in binary representation into a representation in a base of at least two relatively prime numbers on a finite space of size equal to the product of the relatively prime numbers.

8. Method according to claim 7, wherein the conversion step used for the channel response calculation is partly or entirely common with the conversion step used in a Fourier transform and/or synchronization.

9. Method according to claim 1, wherein the said modal representation is an RNS representation.

10. Method according to claim 1, wherein the said modal representation is an QRNS representation.

11. Method according to claim 1, wherein said multi-carrier signal is an OFDM signal.

12. A multi-carrier signal reception device, comprising:
demodulation means of said multi-carrier signal that itself comprises
  means to convert a signal received in binary representation into a modal representation in a base of at least two relatively prime numbers on a finite space of size equal to the product of the relatively prime numbers and means to compute, for each relatively prime number,
a sliding window Fourier transform of said multi-carrier signal in modal representation projected onto the space generated by said number for at least a part of the carriers of the multi-carrier signal and
means to synchronize said multi-carrier signal with a receiver based on the sliding window Fourier transform.

* * * * *